US009692195B2

(12) United States Patent
Mittelstadt et al.

(10) Patent No.: US 9,692,195 B2
(45) Date of Patent: Jun. 27, 2017

(54) NO-TOUCH BUSWAY PLUG IN UNITS

(71) Applicant: SCHNEIDER ELECTRIC USA, INC., Schaumburg, IL (US)

(72) Inventors: Chad Mittelstadt, Cedar Rapids, IA (US); Tim Faber, Marion, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 24 days.

(21) Appl. No.: 14/966,148

(22) Filed: Dec. 11, 2015

(65) Prior Publication Data

US 2017/0018898 A1 Jan. 19, 2017

Related U.S. Application Data

(63) Continuation-in-part of application No. 14/802,483, filed on Jul. 17, 2015, now Pat. No. 9,564,741, and a continuation-in-part of application No. 14/802,574, filed on Jul. 17, 2015, now Pat. No. 9,437,385, and a continuation-in-part of application No. 14/802,700, filed on Jul. 17, 2015.

(51) Int. Cl.

| | |
|---|---|
| ***H02B 1/20*** | (2006.01) |
| ***H02B 1/26*** | (2006.01) |
| ***H01R 25/16*** | (2006.01) |
| ***H01R 13/453*** | (2006.01) |
| *H01R 105/00* | (2006.01) |
| *H01R 4/38* | (2006.01) |
| *H01R 13/70* | (2006.01) |

(52) U.S. Cl.

CPC ......... *H01R 25/162* (2013.01); *H01R 13/453* (2013.01); *H01R 4/38* (2013.01); *H01R 13/4538* (2013.01); *H01R 13/70* (2013.01); *H01R 2105/00* (2013.01)

(58) Field of Classification Search

CPC ............................ H01R 25/162; H01R 13/453

USPC ....... 361/601, 602, 611, 612, 613, 614, 622, 361/624, 627, 637, 638, 639, 640, 641, 361/648, 649, 650, 675

See application file for complete search history.

(56) References Cited

U.S. PATENT DOCUMENTS

| | | | | | |
|---|---|---|---|---|---|
| 2,725,542 | A * | 11/1955 | Born | H02G 5/08 | 439/114 |
| 3,096,131 | A * | 7/1963 | Adams | H02B 1/21 | 174/68.2 |
| 3,113,820 | A * | 12/1963 | Norden | H02B 1/21 | 174/68.2 |

(Continued)

*Primary Examiner* — Anthony Haughton
(74) *Attorney, Agent, or Firm* — Locke Lord LLP

(57) ABSTRACT

Apparatus for substantially eliminating exposure to live parts on a busway plug-in unit enclosure includes a power take-off with male-terminal stabs which are capped with nonconductive material. A nonconductive structure covers the bus assembly and allows only the stabs to pass into the interior of a plug-in unit enclosure. A shutter assembly in each plug-in unit enclosure has a nonconductive shutter plate that moves only longitudinally along the stabs when a plug-in unit device is inserted into the enclosure. Inserting the plug in unit device into the enclosure causes a shutter plate latch to open and depress the shutter. When the plug in unit device is removed from the plug in unit enclosure, the shutter plate is biased upward and latched in a position over the stabs. No live touch points are available in the enclosure.

14 Claims, 7 Drawing Sheets

(56) References Cited

U.S. PATENT DOCUMENTS

| | | | | | |
|---|---|---|---|---|---|
| 3,142,003 | A * | 7/1964 | Olashaw | H02B 1/36 | 174/559 |
| 3,725,746 | A * | 4/1973 | Carroll | H02B 1/308 | 361/624 |
| 4,077,687 | A * | 3/1978 | Farag | H02G 5/08 | 439/251 |
| 4,316,234 | A * | 2/1982 | Takagi | H02B 1/21 | 361/2 |
| 5,510,960 | A * | 4/1996 | Rosen | H01R 9/2425 | 361/624 |
| 5,642,256 | A * | 6/1997 | Pugh | H02B 1/36 | 200/50.02 |
| 6,280,216 | B1 * | 8/2001 | Bernier | H02B 11/12 | 439/251 |
| 6,414,839 | B1 * | 7/2002 | Derksen | H02B 11/24 | 200/50.22 |
| 2006/0067018 | A1 * | 3/2006 | Malkowski | H02B 11/04 | 361/2 |

* cited by examiner

NO-TOUCH BUSWAY PLUG IN UNITS

The present U.S. Patent Application is a Continuation-In-Part (CIP) of co-pending U.S. patent application Ser. No. 14/802,483, filed Jul. 17, 2015, U.S. patent application Ser. No. 14/802,574, filed Jul. 17, 2015 and U.S. patent application Ser. No. 14/802,700, filed Jul. 17, 2015 (hereinafter the "parent applications"), of which the entire disclosures are incorporated herein by reference. The Applicant claims benefit of the priority filing date of the parent applications, under 35 U.S.C. 120, for claims in the present U.S. Patent Application, which are directed to the subject matter disclosed in the parent applications.

FIELD OF THE INVENTION

The present disclosure relates to a method and apparatus for reducing the chances of exposure to live parts in the busway system and more particularly to methods and apparatus for inserting and removing an electrical device from a busway plug in unit.

BACKGROUND OF THE INVENTION

Busways for electrical distribution systems are commonly understood in the art to include multiple pre-assembled sections of ducts containing individually insulated, usually flat electrical conductors or busbars. The individual sections are designed to be easily connected together, both electrically and mechanically, end-to-end to form any desired length. In a plug-in busway, at least some of the sections are equipped with built-in electrical stabs adapted to receive plug-in units which are enclosures for attaching electrical devices to be connected to the busway. Such devices may include power take offs (receptacles), metering, and other branch devices typically controlled by a circuit breaker at the junction point of the branch. However, currently known plug-in units may present exposed conductor within the plug in units. During the installation process of equipment, such as circuit breakers, into the plug in unit enclosure connection of the breaker to exposed conductors may represent a safety concern for the operator or a chance for arcing which could damage the equipment. With an increasing industry emphasis on operator safety and electrical arc control, it is believed that an improved system of plug in unit assembly for busways is desirable.

Thus, a need exists for an improved way to insert and remove devices from the plug in unit enclosure, sometimes as part of a larger scheme for installing and removing branch circuit devices without deenergizing the electrical busway system. Likewise, it may be desirable to provide apparatus and methods for safely connecting a plug in unit enclosure at the busway conductor stabs in the first instance without producing significant safety or arcing hazard in addition to providing the aforementioned measures to prevent unintentional contact with live, i.e. energized, conductors within the plug in unit.

SUMMARY OF THE DISCLOSED EMBODIMENTS

The embodiments disclosed herein are directed to methods and systems, often known in the art as "finger safe" provisions for reducing or eliminating the possibility of exposure to live parts in a busway, and particularly at the plug in units of the busway, and safely installing and removing a circuit breaker or other branch electrical devices from the conductors within the plug in unit. While the illustrated embodiments are explained with circuit breakers in mind as the branch control device, the present invention is not necessarily limited to a circuit breaker control environment.

The disclosed embodiments provide a shutter assembly for the plug in unit that automatically closes off access to pin shaped conductors extending from each bus of the main busway section into the plug in unit until a circuit breaker is inserted in the plug in unit. A shutter assembly is attached in the circuit breaker mounting compartments, sometimes referred to herein as "wells," of the plug in unit and serves as one part of a protective barrier for the busses of the plug in unit. The circuit breaker is designed so that inserting it in the complementary plug in unit in a Z-axis motion unlocks and depresses a shutter plate of the shutter assembly in a Z-axis motion and allows the circuit breaker to access the conductors in the plug in unit, which also extend in the Z-axis. When the circuit breaker is removed from the plug in unit, the shutter plate rises, locks and again closes off access to the conductors. Such a shutter assembly helps operators to safely insert and remove a circuit breaker or other electrical device from the plug in unit while also minimizing the potential for exposure to live parts in the plug in unit.

In some implementations, the cylindrical contact pins of the bus conductors may comprise pins brazed or otherwise tenaciously fastened to each phase conductor of the busway at the proper orientation as well as a set of similarly oriented pins for the neutral conductor which are attached to a single bar which is bolted or otherwise fastened to the neutral bus of the main busway section to provide a neutral path for each conductive phase.

In some implementations, the shutter assembly comprises one moving part which is a perforate shutter plate with biasing towards the raised, or protective position. One or more springs at the sides of the shutter plate comprise a latching mechanism holding the shutter plate in the raised position in the absence of a circuit breaker interacting therewith. Thus the shutter assembly is robust and economical. The conductor system of the plug in unit is laid out to directly accept the stabs from the main busway conductors into the plug in unit to have the power delivery and neutral return terminals, i.e. stabs, extended in the Z axis so that the stabs pass closely through the perforations of the shutter plate when it is depressed by an insertion of the breaker. Each stab preferably sits beneath the top level of the shutter plate and is also capped with a nonconductive material to further prevent access to electrically live touch points. The line and neutral terminals of the complementary circuit breaker are female receptacles in the bottom of the breaker which cover and electrically connect to the bus stabs upon insertion of the breaker.

Within each plug in unit is a compartment for a circuit breaker, the compartment desirably being a well-like structure with sides that extend in the Z axis to substantially cover the depth of the breaker when inserted to further minimize access to live conductors, similar to that introduced in Applicant's co-pending U.S. patent application Ser. No. 14/802,483 [CRC-0307]. The load side power and neutral connections for a branch circuit breaker are prewired onto the breaker and held by a separate cover before insertion of the breaker into the compartment. The shutter plate will have the necessary length and width to safely cover the portion of the circuit breaker compartment conveying power and may include a mechanism that allows the shutter assembly to be firmly retained in the breaker compartment of the plug in unit. The breakers are preferably equipped with positive retention interlocks providing a hold down mechanism and an interlock which will not allow the breaker to be inserted to, or removed from, the compartment in the ON position. Such interlocks were illustrated previously in Applicant's U.S. patent application Ser. No. 14/449,881 [CRC-0298].

Inserting the circuit breaker in the plug in unit forces the shutter plate to slide from the raised, or protective, position into an lowered, or unprotected, position where the busway stabs extend through openings, i.e. throughholes, in the shutter plate aligned therewith, thereby allowing the female line-side terminals of the circuit breaker to contact, i.e. electrically connect to, the male busway conductor stabs which are contained in the plug in unit.

In some implementations, the circuit breaker may have inclined planes on portions of an outer casing of the circuit breaker, for example, on the side walls thereof. As the circuit breaker is inserted in the plug in unit, the inclined planes act as a keying mechanism to line up with latches holding the shutter plate in the protective raised position, until the flat sides of the breaker engage with and release the latches allowing the shutter plate to be moved into the lowered unprotected position. When the circuit breaker is removed from the plug in unit, the shutter plate is forced upward by a biasing coil spring on the bottom side thereof and the latches, which are separate flat spring mechanisms, move back into the well to latch the shutter plate in the protective position. The wire gutter need not be separately covered according to certain aspects of the present invention.

In one aspect, the disclosed embodiments are directed to a breaker compartment in a plug in unit, and a shutter assembly in the breaker compartment, the shutter assembly disposed over the live conductor contacts and movable in one axis by a circuit breaker insertion in the same axis between a closed position in which the shutter assembly blocks access to the conductors of the plug in unit and an open position in which the shutter assembly allows access to the conductors in the plug in unit. Inserting a circuit breaker in the plug in unit automatically puts the shutter assembly in the open position and removing the circuit breaker from the plug in unit automatically puts the shutter assembly in the closed position.

In another aspect, the disclosed embodiments are directed to a plug in unit having pin-shaped stabs coming directly from each bus conductor in the busway main section. Laid over the pin-shaped stabs is a plug in unit enclosure with a circuit breaker compartment structure in the form of an open-faced box, with the bottom surface of the enclosure covering all the busway structure but the stabs. The circuit breaker compartment structure provides individual compartments for each pole of the breakers in the plug in unit device and allows the stabs to protrude into the compartments; with each compartment having a shutter assembly including a shutter plate with throughholes for the stabs, a bias spring urging the shutter plate to the closed position, and preferably a latch for holding the shutter plate to the raised protective position wherein access to the stabs is closed off.

BRIEF DESCRIPTION OF THE DRAWINGS

The foregoing and other advantages of the disclosed embodiments will become apparent upon reading the following detailed description and upon reference to the exemplary explanatory drawings offered to illustrate the invention according to one or more embodiments disclosed herein, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
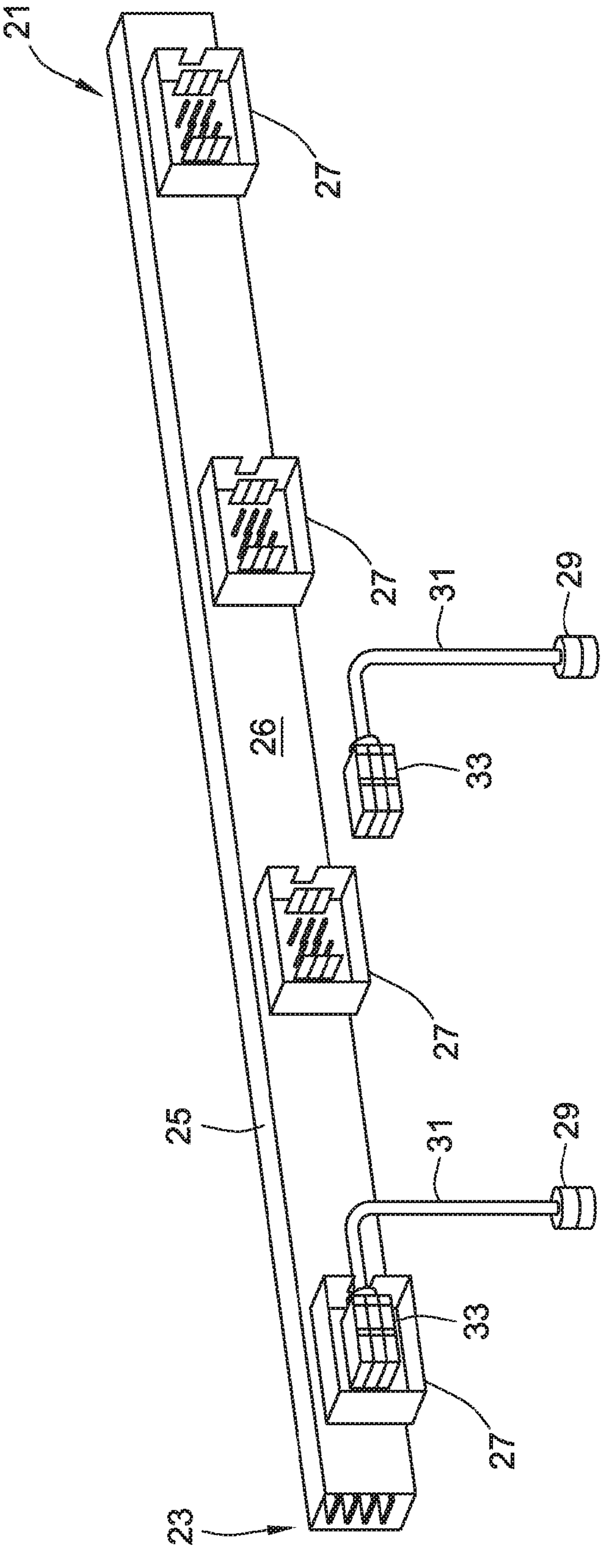
FIG. 1. shows a simplified front perspective view of a section or sections of the main busway with plug in units placed thereon and with two power take off devices, one of which is connected into the left-most plug in unit.

Referring now to FIG. 1, a busway system 21 comprises prefabricated sections of stacked busbars 23, in this case four conductors being a neutral conductor and three phase conductors, which can be readily assembled together to create a power delivery structure for an industrial facility. The stacked busbars 23 are surrounded by a busway housing 25 providing physical protection and mounting capabilities for the busway. Details of the basic construction and functionality of busway systems are well known in the art and will not be discussed herein in so far as they do not add to the understanding of the present invention. At several locations along the front panel 26 of the busway system 21 are located plug in unit enclosures, collectively 27, allowing power take off connections from the stacked conductors 23. Here the power take-offs are individual branch circuit receptacles 29 on the end of whips 31, i.e., flexible extension cords, with each whip having its own protective circuit breaker 33. Typically these whips 31 will hang down from a busway suspended from the walls or ceiling of the facility. Typically the circuit breaker will be a multipole circuit breaker, here of the three pole variety, although it will be understood the invention is not so limited.

Figure 2:
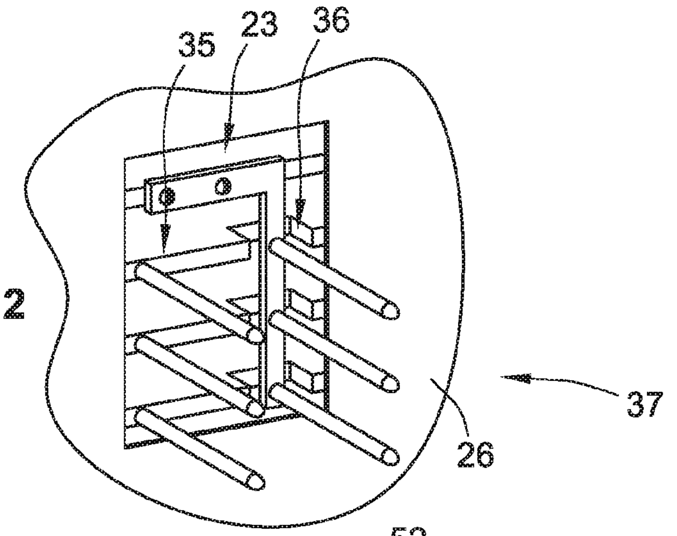
FIG. 2 is a detail of one section of the main busway with the conductor stabs for a plug in unit uncovered.
Figure 3:
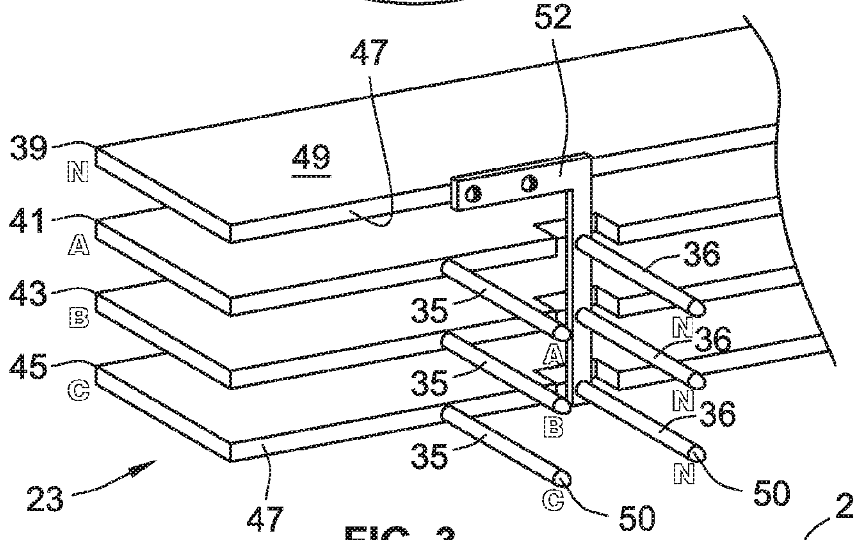
FIG. 3 is a view of the main busway conductors and stabs with all other structure removed.

FIG. 2 is a detail of conductive stabs 35 protruding from the stacked busbars 23 through the front panel 26 of a busway section 37. In the present invention the stabs 35 are pin-shaped to facilitate no-touch or fingersafe connectivity as further discussed below. Referring also to FIG. 3, a view of the stacked busbars 23 and stabs 35, 36, without surrounding structure, the top busbar 39 is the neutral conductor, followed by a second busbar 41, a third busbar 43 and a fourth bottom busbar 45, including one of an A-phase busbar, a B-phase busbar, and a C-phase busbar typically in that order. The phase conductors 41, 43, 45 have their stabs 35 attached such as by brazing or threaded connection or the like, to protrude off a side edge 47 and extend parallel to the top, major plane, surface 49 of its conductor. A conductive L-shaped bracket 52 carries a matching neutral stab collectively 36 for alignment with each phase stab with the bracket 52 being bolted or otherwise tenaciously fastened to the neutral busbar 39. Each stab 35, 36 is tipped with a nonconductive cap 50.

Figure 4:
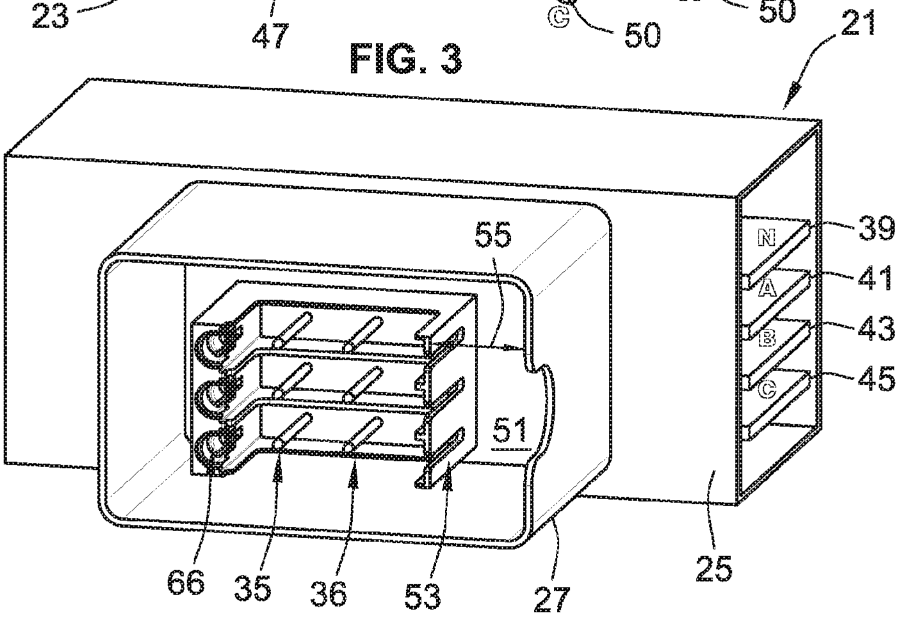
FIG. 4 is a detail of one section of the main busway with a plug in unit in place and the uncovered conductor stabs protruding into the plug in unit.

As seen in FIG. 4, the plug in unit enclosure 27, a five sided box with an open top, is secured in a known fashion on the busway housing 25 with the stabs 35, 36 passing closely through holes in the back wall 51 of the plug in unit enclosure 27 as it abuts the busway housing 25. The stabs 35, 36 thus extend to the interior of the plug in unit enclosure 27. Centrally located within the plug in unit enclosure 27 is a circuit breaker compartment 53 which can be formed on the back wall 51 of the plug in unit enclosure 27 in a one-piece unitary assembly of nonconductive material in an overall box-shape having one open front side for receiving the circuit breakers. The space between the side walls of the plug in unit enclosure 27 and the sidewalls of the circuit breaker compartment 53 forms at least one wiring gutter 55. Also visible in FIG. 4 are the receptacles 66 for the positive retention interlocks 67, best seen in FIG. 5A of each pole of the circuit breakers 33. Such interlocks were illustrated previously in Applicant's U.S. patent application Ser. No. 14/449,881 [CRC-0298] which is incorporated by reference herein in its entirety.

Figure 5A:
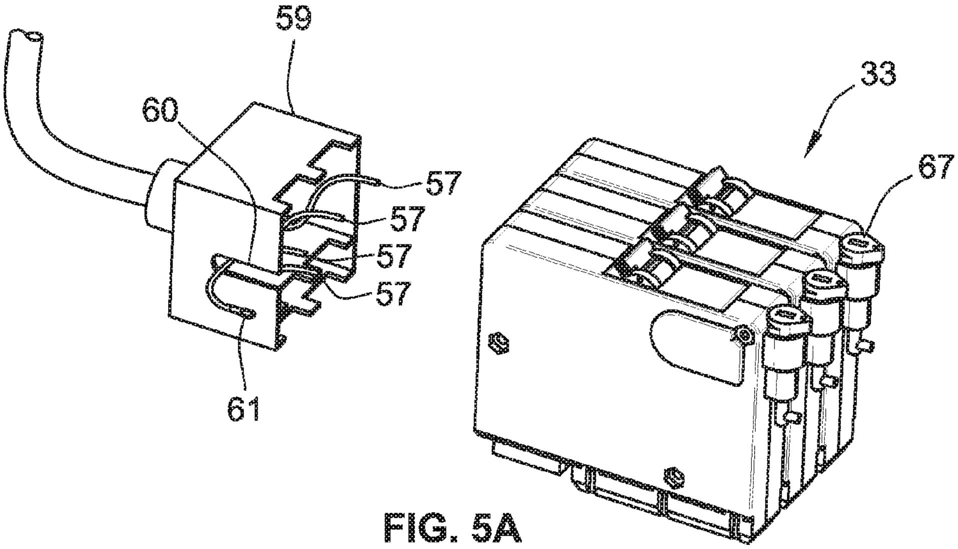
FIG. 5A shows a perspective view illustrating the wiring of a power take off receptacle cord to the branch breaker.
Figure 5B:
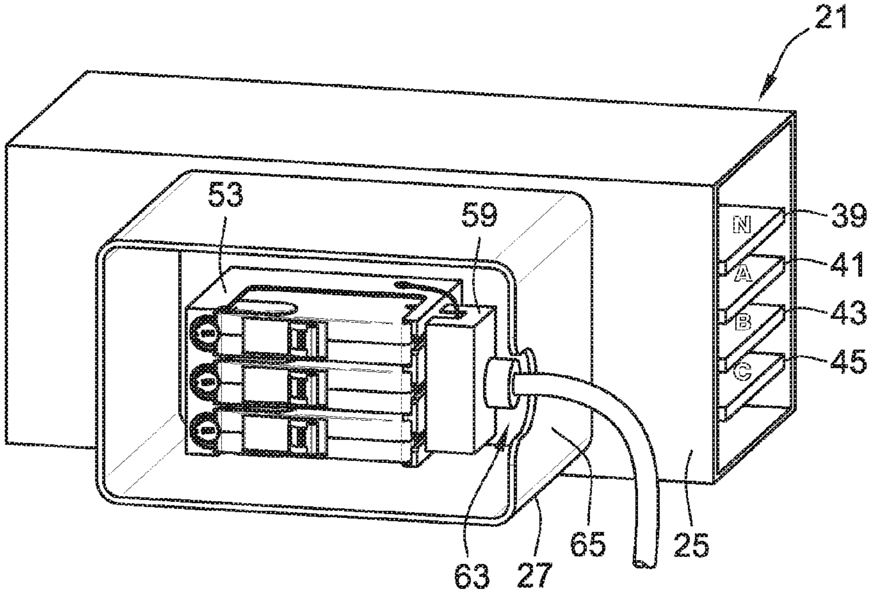
FIG. 5B shows a separate cover for the receptacle cord wiring attached to the branch breaker and fitted to the plug in unit.

FIG. 5A illustrates the required prewiring of the circuit breaker 33 to the conductors, collectively 57, of the receptacle whip 31 prior to insertion in the plug in unit enclosure 27, with all phase conductors and neutral line being inserted and captured in the interior of a nonconductive case 59 having an exit slot 60 for a grounding terminal 61. Once the whip conductors 57 are wired to their respective poles of the three pole circuit breaker 33, the nonconductive case 59 is fastened to the load side of the breaker 33 so that it can be attached as a single unitary control device with no exposed conductors into the plug in unit 27 and the breaker compartment 53 (FIG. 5B). FIG. 5B illustrates the inserted circuit breaker 33 in its compartment 53 with branch load and neutral lines of the whip 31, exiting through a slot 63 in the end wall 65 of the plug in unit enclosure. The wiring case 59 is fitted over the end wall of the breaker compartment 53 and rests in the wiring gutter 55.

Each stab 35, 36 is capped with a nonconductive cap 50 at its free end, as mentioned above and shown in FIGS. 2-4. The stabs 35, 36 rest within the circuit breaker compartments and are then covered with the shutter plates 69, such as seen in FIG. 6 and FIG. 7, such that the free ends of the stabs, preferably including the nonconductive caps 50, rest below the upper surface of the shutter plates 69 and within throughholes 71 of the shutter plates 69 so as to allow access to the stabs 35, 36 when the shutter plates are depressed by circuit breaker insertion.

Figure 6:
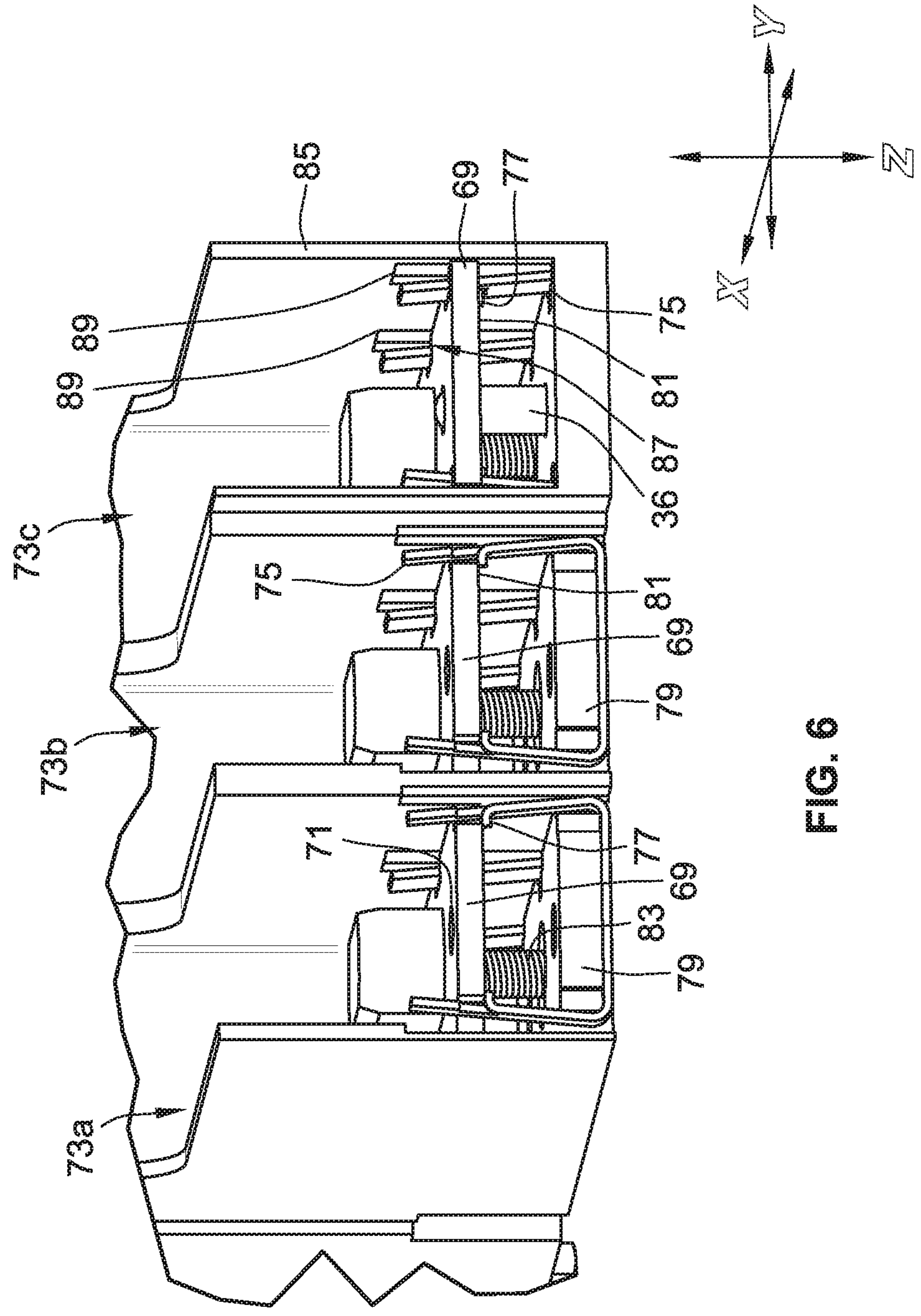
FIG. 6 is a perspective cutaway view of individual pole slots for the circuit breaker compartments, two with partial cutaway; showing details of the shutter assemblies therein.

FIG. 6 shows partially cutaway compartment structures to show further details of the shutter assemblies with a shutter plate, collectively 69, within the structure of each of the circuit breaker pole compartments 73*a*-73*c*, and supported in the raised and protected position by latches 75 engaging the shutter plates 69. The stabs are left out of the view of the compartment structures of 23*a* and 23*b* so that further detail of the shutter assemblies may be seen. The latches 75 are in the form of U-shaped flat springs with the curve of the U held in place by a section of a bottom plate 79 of the circuit breaker compartment 53. The upwardly extending arms of the U's have inward facing tabs 77 upon which rest the bottom surface 81 of the nonconductive shutter plate 69. While shown as a plurality of U-shaped springs in each compartment 73*a*-73*c*, it will be appreciated that the number and design of the latch elements may vary.

Figure 8:
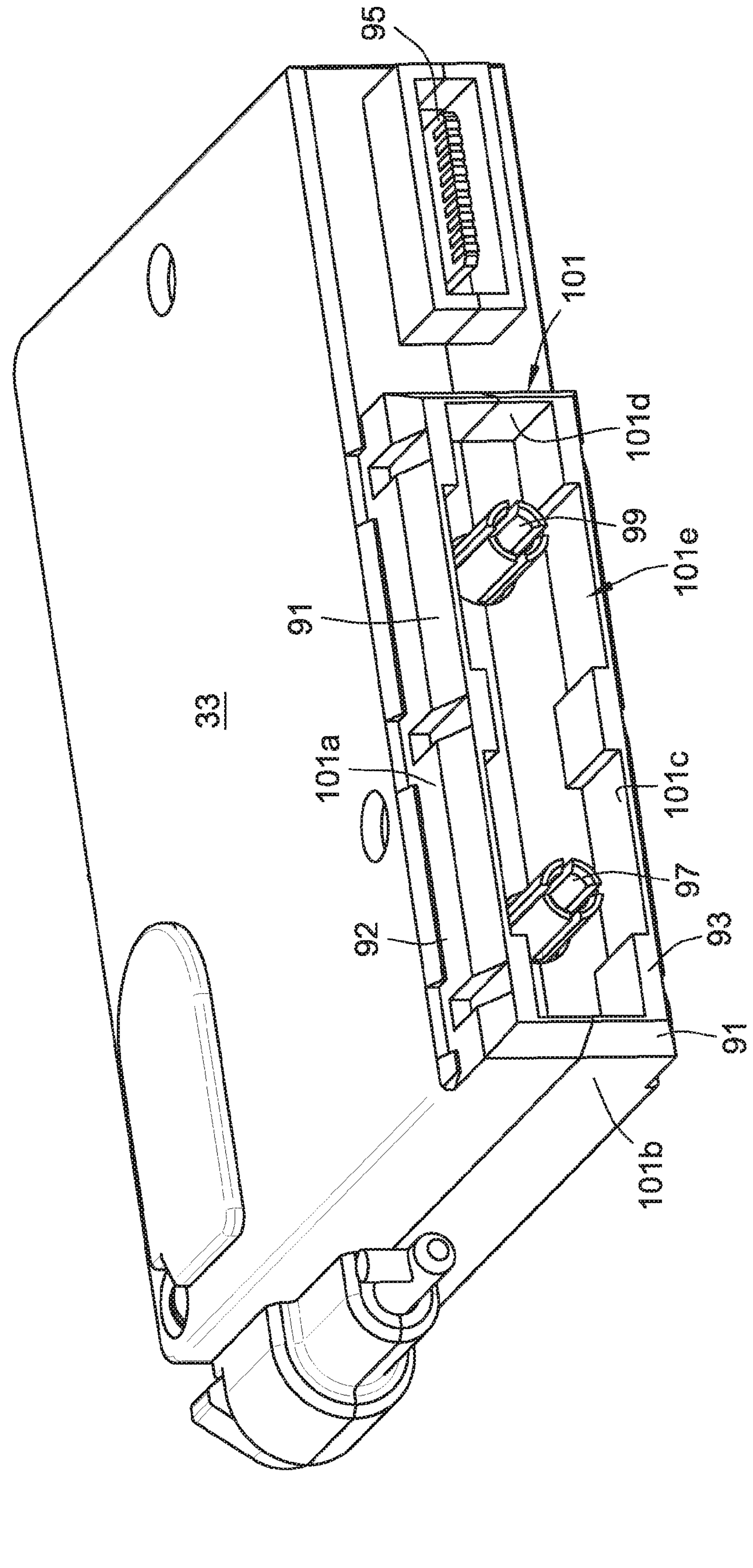
FIG. 8 shows details of the keying features from the bottom of a one pole breaker.
Figure 9:
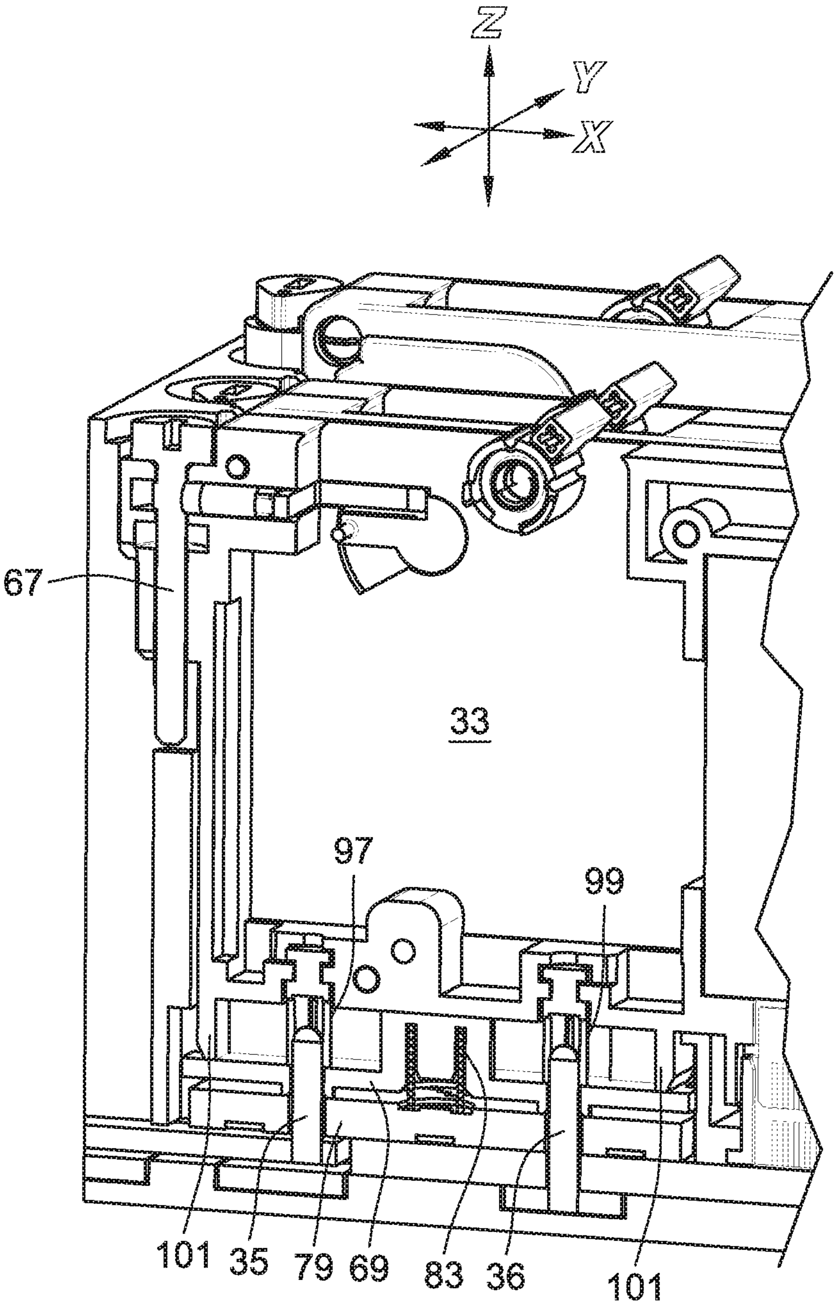
FIG. 9 is a partial cutaway view showing details of a one pole breaker installed into a breaker well according to some aspects of the invention.

As further seen in FIG. 6, a coil spring 83 is placed between the bottom surface 81 of the shutter plate 69 and the bottom plate 79 of the circuit breaker pole compartment 73*a*-73*c* to bias the shutter plate 69 upwardly in the Z axis towards the raised and protected position in which it is latched. The latches 75 are pushed by shaped elements of the inserted breaker case (FIGS. 7-8) to the side walls 85 of the circuit breaker compartment 73*a*-73*c*, thereby moving the tabs 77 out from under the lower surface 81 of the shutter plate 69 to unlatch the shutter plate 69 and allow it to move downwardly to the lowered and unprotected position (FIG. 9). Such breaker arrangements were illustrated previously in Applicant's U.S. patent application Ser. No. 14/802,574 [CRC-0308] which is incorporated by reference herein in its entirety. The shutter plate 69 and side walls 85 may have cut outs 87, 89, respectively, providing a space into which the latch arms and tabs 77 can be accommodated when the shutter plate is descending.

Figure 7:
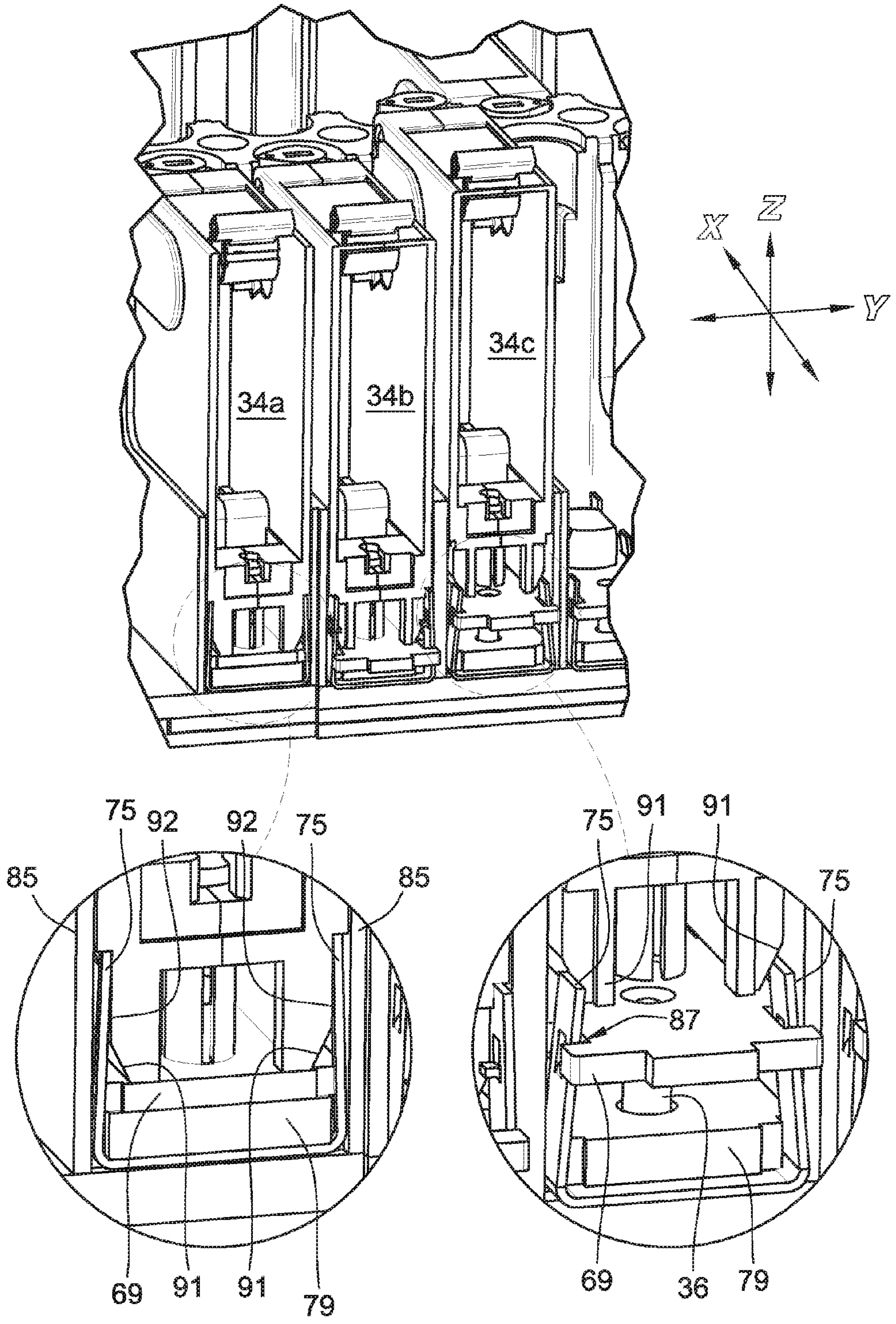
FIG. 7 shows medial sectional perspectives through the Y-Z plane of three exemplary circuit breaker poles of the breaker compartment with conductor pins in different stages of engagement with the shutter assemblies.

Referring also to FIG. 7, cross sections of two circuit breaker poles 34*a*, 34*b* are shown in the fully inserted position while a third 34*c* is shown in a partially inserted position. As seen more plainly in the single pole breaker illustration of FIG. 8, the lower edges 91 of each breaker 33 are inclined or beveled in order to gradually force the latches 75 towards side walls 85 until the flat sides 92 of the circuit breakers above the beveled lower edges 91 force the latches fully open allowing the shutter plates 69 to be forced down by the bottom surfaces 93 of the circuit breakers 33. It will be noted in FIG. 8 that the bottom of the circuit breaker may also contain a communications port 95 by which appropriately equipped circuit breakers may communicate various information, or receive DC power, or both. The line side terminals 97, 99 of the breaker 33 are also surrounded by a case extension 101 on four sides 101*a*, 101*b*, 101*c*, 101*d* with an open bottom 101*e*. The case extension 101 helps define the exterior dimensions of the case and may be an integrally formed part of the breaker case. The line terminals can then access the complementary stabs of the busway through the open bottom 101*e* of the case extension 101.

This arrangement provides enclosed connections between the line terminals and the stabs of the complementary busway, as seen in FIG. 9.

As seen in FIG. 9 once the circuit breaker 33 is fully inserted with a Z axis motion, the shutter plate 69 is fully depressed in the Z axis to the bottom plate 79 of the circuit breaker compartment structure 53 allowing the line terminal 97 and neutral female terminal 99 inside the bottom surface 93 of the circuit breaker 33 to make electrical contact with the busway stabs 35, 36. The positive retention interlock 67 has been fastened, securing the circuit breaker in the circuit breaker compartment 53 and allowing it to be placed in the ON position.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

What is claimed is:

1. A busway assembly, comprising:

a) a busway housing;

b) a plurality of busbars arranged in a flat stacked configuration, c) the busbars being located at least in part within the housing and including a first top busbar, a second busbar, a third busbar and a fourth bottom busbar, for providing each of a Neutral busbar, an A-phase busbar, a B-phase busbar, and a C-phase busbar; each busbar having a top surface, a bottom surface, a front side surface, a rear side surface, a forward edge and a trailing edge; and a conductive stab tenaciously engaged to and extending beyond the busway housing in a vertically aligned row from the front side surface of the A, B and C phase busbars;

d) a row of conductive stabs tenaciously engaged to and extending in a first axis beyond the busway housing from the front side surface of the Neutral busbar and parallel to the row of stabs for the A, B and C phase busbars;

e) all the conductive stabs having a free end distal from the busses, the free ends having caps of nonconductive material; and f) at least one plug-in unit enclosure covering any openings in the busway housing which allow the conductive stabs to extend therefrom.

2. The busway assembly according to claim 1, further including the plug in unit enclosure having circuit breaker compartments for receiving circuit breakers inserted along the first axis; the circuit breaker compartments having the stabs protruding therein;

a shutter plate in each pole of the circuit breaker compartments, each shutter plate being nonconductive and having a throughhole for receiving a stab of the phase busbar and a throughhole for receiving a stab of the neutral busbar; and the shutter plate having a raised position overlaying all stabs in its circuit breaker compartment and having a lowered position allowing the stabs to protrude through the shutter plate.

3. The busway assembly of claim 1, wherein the stabs are pin-shaped.

4. The busway assembly of claim 1, wherein the plug in unit enclosure further comprises a layer of nonconductive material covering the busway housing and allowing the stabs to protrude therethrough.

5. The busway assembly of claim 4, wherein the layer of nonconductive material is a nonconductive plate with throughholes for the stabs.

6. The busway assembly of claim 5, wherein the nonconductive plate is a wall of a one-piece unitary assembly of nonconductive material having the circuit breaker compartments formed therein.

7. The busway assembly of claim 2, further comprising: the shutter plate being part of a shutter assembly having a biasing spring for urging the shutter plate to the raised position.

8. The busway assembly of claim 7 further having a latch for retaining the shutter plate in the raised position.

9. The busway assembly of claim 8, wherein the latch includes a U-shaped flat spring with tabs on the arms of the U to engage the shutter plate.

10. The busway assembly of claim 9, wherein the arms of the U have a first position extending the tabs into contact with the shutter plate and a second position upon contact with a complementary-shaped circuit breaker wherein the tabs are forced towards side walls of circuit breaker compartment, thereby releasing the latch.

11. The busway assembly of claim 2, further comprising: a wiring gutter between a wall of the plug in unit enclosure and a wall of the circuit breaker compartment.

12. The busway assembly of claim 11, further comprising: a slot in the circuit breaker compartment on that side of the circuit breaker compartment leading to the wiring gutter and sized to allow wires to pass through.

13. The busway assembly of claim 2, further comprising a multipole circuit breaker fitted within the circuit breaker compartment, attached to the stabs thereof, and having no exposed conductors.

14. The busway assembly of claim 2, further comprising a three pole circuit breaker fitted within the circuit breaker compartment, attached to the stabs thereof, and having no exposed conductors.

* * * * *